D. MORRIS.
PNEUMATIC ANNUNCIATOR.

No. 175,486. Patented March 28, 1876.

Witnesses
Edward L. Osburn
Wm. E. Paige

Inventor
David Morris
By G. Wm. Smith
Atty

UNITED STATES PATENT OFFICE.

DAVID MORRIS, OF SAN FRANCISCO, CALIFORNIA.

IMPROVEMENT IN PNEUMATIC ANNUNCIATORS.

Specification forming part of Letters Patent No. 175,486, dated March 28, 1876; application filed February 24, 1876.

*To all whom it may concern:*

Be it known that I, DAVID MORRIS, of the city of San Francisco, State of California, have invented an Improved Pneumatic Hotel-Annunciator, of which the following is a specification:

My invention consists in the combination and arrangement of mechanism whereby the pressure given at one end of a column of air confined in hollow spheres and tubes is caused to sound a bell, and display a number or signal at the other end, as will be fully described and explained hereafter.

Figure 1:
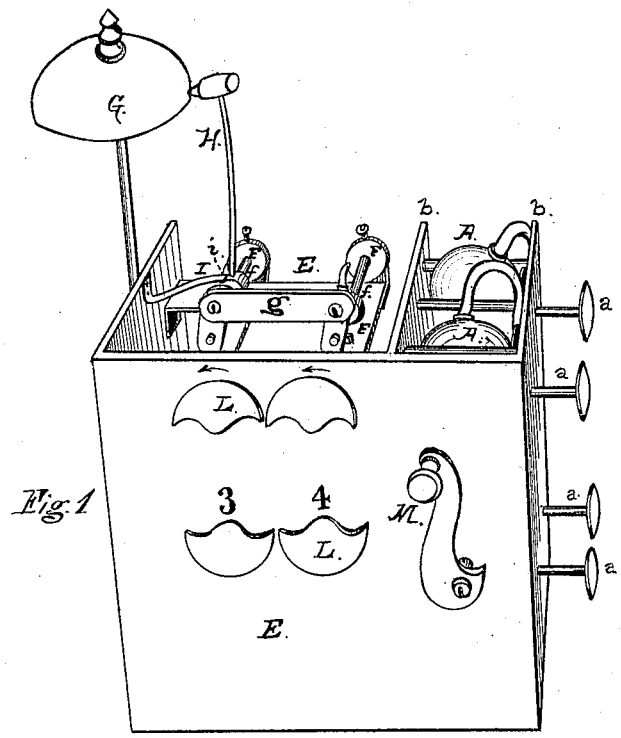
Figure 2:
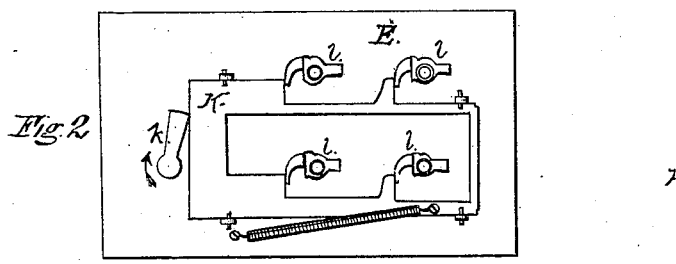
Figure 4:
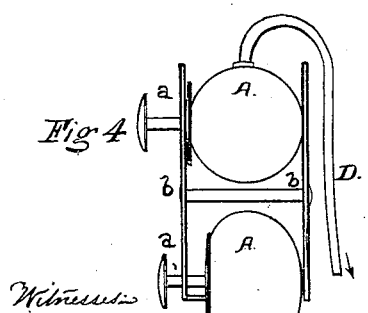
Figure 3:
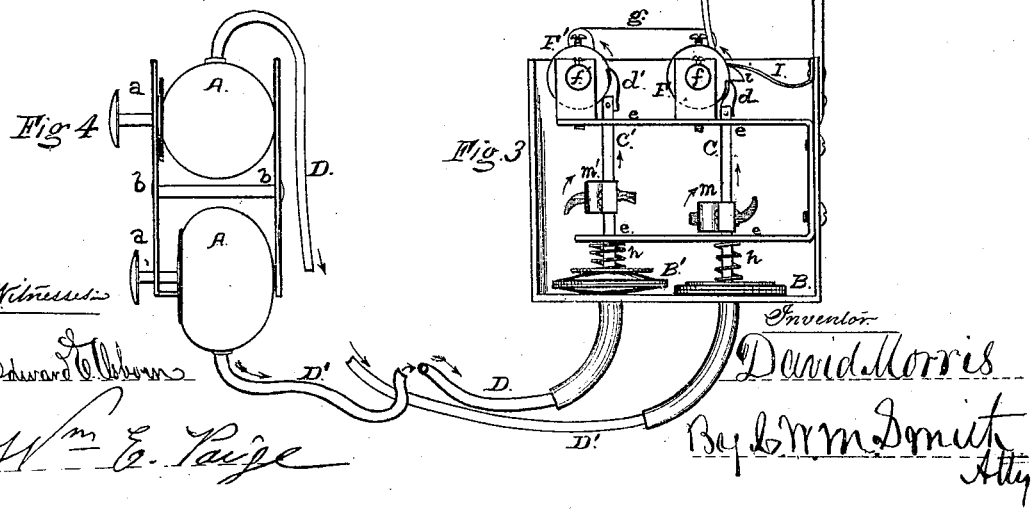

The accompanying drawing shows, in Figure 1, a perspective view, illustrating my invention; in Fig. 2, a view of the mechanism for closing the disks that cover the numbers on the front of the annunciator; and, in Figs. 3 and 4, the mechanism for transmitting the pressure and giving the signals as they are arranged at the ends of the conducting-tubes.

The principal elements of my invention are a hollow elastic bulb or sphere, A, so arranged that it may be compressed by a button, *a*, or other means, a tube, connected at one end to this sphere, and to the flattened disks B at the other end, and a rod or stem, C, placed above the disk, and connected with suitable mechanism, so that when the bulb is compressed the air will pass into and inflate the elastic disk B and raise the stem C, thus operating the signaling mechanism at each pressure upon the button.

The plates *b b* may represent a case, that is placed within the wall of the room, or in any suitable situation, so that the buttons may project and be conveniently operated. The tube D leads from this bulb A into the room where the annunciator-case E is placed, and here it is connected with the flattened elastic disk B in the bottom of the case. C is a rod or stem, moving freely in bearings *e e* extending across the sides of the case, and having a metal plate secured to the lower end that rests upon, and is held against, the face of the elastic disk B by a light spring, *h*. The upper end of this stem is provided with a dog or finger, *d*, that engages with a notch in the disk F, secured upon the shaft *f*, and thus every upward movement of the stem C causes the dog *d* to partially rotate the disk and its shaft *f*. The annunciator-case contains one of these elastic disks B, its stem C, and notched disk F for every bulb or sphere connected with it; but several of the disks F are secured to one shaft, *f*.

Figs. 1 and 3 of the drawing show an arrangement of mechanism for transmitting signals from the bulbs. Two shafts, *f f'*, are held in bearings, and connected, the one with the other, by the rock-bar *g*, so that the rotation of the shaft *f'* is communicated to the shaft *f*, for this last shaft carries the hammer that sounds the signal upon the gong G. The notched disks or cams F are arranged, in the above drawings, two upon each shaft, and, consequently, the raising of any one stem causes the shaft *f* to turn and draw back the hammer H. The reaction of this shaft is produced by the spring I, that presses upon a projecting finger, *i*, secured to the shaft, and in this manner the stems C cause the gong G to sound. The notches of the disks F are of such shape that the ends of the dogs or fingers *d* will slip past them as they pass the center of the disk, and allow it and its shaft to turn back or react.

The numbers on the face of the annunciator are uncovered and covered by means of the mechanism shown in Figs. 2 and 3. The plates L turn on pivots, that have upon the ends within the case a bar, *l*, weighted at one end, and having a curved finger or cam at the other end. A bar, *m*, secured to the side of the stem C, projects across the case, and beneath the weighted end of the bar *l*, so that, as the stem C is raised, the bar *l* is turned up and over the center, so that it falls over on the opposite side, and rotates the plate L, that covers the number. This action of the stem C and its bar *m* in uncovering the numbers leaves the cam-fingers of the bar *l* in the position shown in Fig. 2, when their rotation in the opposite direction, to cover the numbers, is effected by the sliding plate K and lever *k* on the end of the handle M, Fig. 1.

As thus constructed and arranged my invention serves to transmit signals whatever the lengths of the conducting-tubes may be; and it is capable of being constructed in a simple and inexpensive manner, and of transmitting any number of signals from different places to one point.

Having thus fully described my invention, what I claim therein as new, and desire to secure by Letters Patent, is—

1. In combination, the series of flattened disks B B', the stems C C', with their fingers $d\ d'$, the notched disks or cams F F, secured upon the shafts $f\ f'$, and the rod and hammer H, when the whole are arranged and connected together with the air-bulbs A A', and with the spring I, to cause the disks to become inflated when the bulbs are compressed, and the shaft $f$ to react and give a signal, substantially as described and specified.

2. The combination, with the movable stems C C', having the arms $m\ m'$ secured thereto, of the elastic disks B B' and the plates or shields L of the annunciator, substantially as described and shown.

Witness my hand and seal this 10th day of February, 1876.

DAVID MORRIS. [L. S.]

Witnesses:
C. W. M. SMITH,
N. PROCTOR SMITH.